United States Patent
Baker

(10) Patent No.: US 9,397,596 B2
(45) Date of Patent: Jul. 19, 2016

(54) MIXER WITH DIRECT DRIVE DC MOTOR

(71) Applicant: Whirlpool Corporation, Benton Harbor, MI (US)

(72) Inventor: Richard L Baker, Lewisburg, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 108 days.

(21) Appl. No.: 13/767,090

(22) Filed: Feb. 14, 2013

(65) Prior Publication Data
US 2014/0226436 A1   Aug. 14, 2014

(51) Int. Cl.
| | | |
|---|---|---|
| B01F 7/00 | (2006.01) | |
| H02P 7/06 | (2006.01) | |
| B01F 15/00 | (2006.01) | |
| H02K 7/00 | (2006.01) | |
| A47J 43/08 | (2006.01) | |

(52) U.S. Cl.
CPC ............. *H02P 7/06* (2013.01); *A47J 43/082* (2013.01); *B01F 15/00538* (2013.01); *H02K 7/003* (2013.01)

(58) Field of Classification Search
CPC .............. A47J 43/044; A47J 2043/04463; A47J 43/046; A47J 43/082
USPC ......... 366/204, 206, 241, 242, 254, 249, 197, 366/287, 288
See application file for complete search history.

(56) References Cited

U.S. PATENT DOCUMENTS

| | | | |
|---|---|---|---|
| 2,069,506 A * | 2/1937 | Ross .............................. | 366/200 |
| 3,220,450 A * | 11/1965 | Aronson, II et al. .......... | 366/205 |
| 4,568,193 A * | 2/1986 | Contri et al. .................. | 366/206 |
| 4,697,929 A * | 10/1987 | Muller ............................ | 366/97 |
| 4,822,172 A | 4/1989 | Stottmann | |
| 5,617,774 A * | 4/1997 | LaVelle et al. ................. | 366/282 |
| 6,068,397 A | 5/2000 | Wilday | |
| 7,207,711 B2 * | 4/2007 | Huang et al. ................... | 366/206 |
| 7,614,779 B2 | 11/2009 | Ta et al. | |
| 7,882,734 B2 | 2/2011 | Ciancimino et al. | |
| 2004/0120216 A1 | 6/2004 | Donthnier et al. | |
| 2005/0122836 A1 | 6/2005 | Boyle et al. | |
| 2007/0297283 A1 * | 12/2007 | Ta et al. ......................... | 366/272 |
| 2011/0063941 A1 | 3/2011 | Seidler et al. | |
| 2012/0001002 A1 * | 1/2012 | Donaldson et al. ............. | 241/36 |
| 2013/0192477 A1 * | 8/2013 | Hoare et al. ................... | 366/199 |

FOREIGN PATENT DOCUMENTS

| | | |
|---|---|---|
| DE | 1219643 B | 6/1966 |
| EP | 1870007 A2 | 12/2007 |
| WO | 2008132429 A1 | 11/2008 |
| WO | 2012058784 A1 | 5/2012 |

OTHER PUBLICATIONS

European Patent Application No. 14153851.2 filed Feb. 4, 2014, Applicant: Whirlpool Corporation, European Extended Search Report re: same, mail date: May 16, 2014.

* cited by examiner

*Primary Examiner* — Tony G Soohoo
*Assistant Examiner* — Anshu Bhatia

(57) ABSTRACT

A mixer with a DC motor with a reducing gear is coupled to a speed control circuit. An output shaft from the reducing gear is coupled to a hub drive gear which meshes with a planetary drive gear coupled to a rotary output drive to which mixing implements are removably attached.

21 Claims, 5 Drawing Sheets

MIXER WITH DIRECT DRIVE DC MOTOR

BACKGROUND

The present application relates to mixers for mixing and blending ingredients.

Mixers, such as those employed in the home environment such as the Kitchen Aid® Classic Plus Stand Mixer made by Whirlpool Corporation, provide a heavy duty small appliance for use in a home environment for mixing a variety of ingredients for different culinary uses. Over the years, such mixers have used AC motors with numerous cast components and gear systems to provide the desired variable mixing speeds for different materials being mixed. Thus, for whipping cream, relatively high speeds are required, while mixing bread dough, cookie dough, or the like requires significantly slower speeds. These mixers, in view of the numerous components required including the multiple gears, housings, and the like, are relatively expensive in order to provide the desired functions and make them long lasting and durable.

Reducing the numerous components of such a heavy duty, reliable mixer would significantly reduce the cost of components, as well as the cost of assembly, while still providing a high quality robust mixer would be desirable.

SUMMARY

One variation includes a mixer in which a direct current motor is employed with an output shaft coupled to a reduction gear and directly driving a hub gear coupled to a planetary gear for the output drive for a mixing implement. This allows a relatively inexpensive speed control circuit to control the speed of the DC motor and can employ an integrated motor and reduction gear box, which can be mounted within the mixer housing and utilizes only a hub and planetary gear to complete the drive system for the mixer.

The resultant mixer has far fewer components which could be subject to fail and which require extensive manufacturing and, therefore, are relatively expensive. The improved direct drive mixer includes a DC motor with a reducing gear. A speed control circuit is coupled to a source of alternating current (AC) and converts the AC voltage to variable duty cycle direct current (DC) pulses which are applied to the DC motor to vary the speed of the mixer. An output shaft from the reducing gear is coupled to a hub drive gear which meshes with a planetary drive gear coupled to a rotary output shaft to which mixing implements are removably attached.

The mixer and its operation and other features, advantages, and objects of the present application will be further understood and appreciated by those skilled in the art upon studying the following specification, claims, and appended drawings.

DETAILED DESCRIPTION OF THE PREFERRED EMBODIMENT

Figure 1:
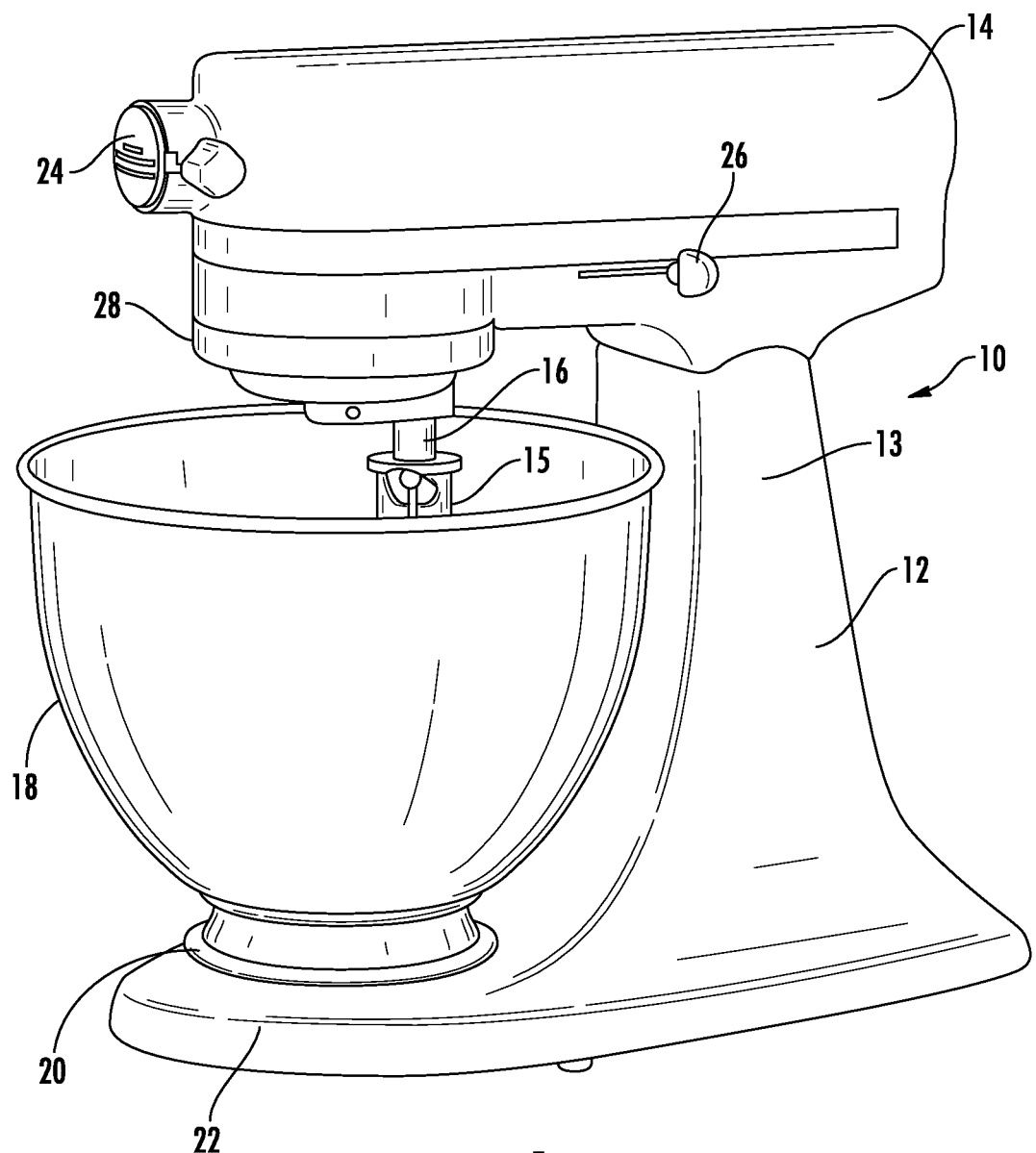
FIG. 1 is a perspective view of a mixer embodying the present improved structure.

Referring initially to the embodiment illustrated in FIG. 1, the reference numeral 10 generally refers to a mixer that includes a pedestal base 12 and a motor housing 14 for enclosing and supporting the internal drive components for an output rotary shaft 16 of the mixer. The pedestal 12 includes a pivot 13 for the housing 14 allowing the head of the mixer to be raised and lowered from a mixing bowl 18 which can be lockably threaded by a bayonet mount 20 to a floor 22 of pedestal 12. Various implements, such as beaters 15, whisks, or other mixing implements, can be removably attached to the mixer 10 in a conventional manner. The mixer 10 may include an auxiliary power takeoff 24 for other implements which can be coupled to the power head of the mixer. The mixer includes a speed control 26, which can be of a lever-type as shown, a rotary dial, or the like as described in greater detail below.

Figure 2:
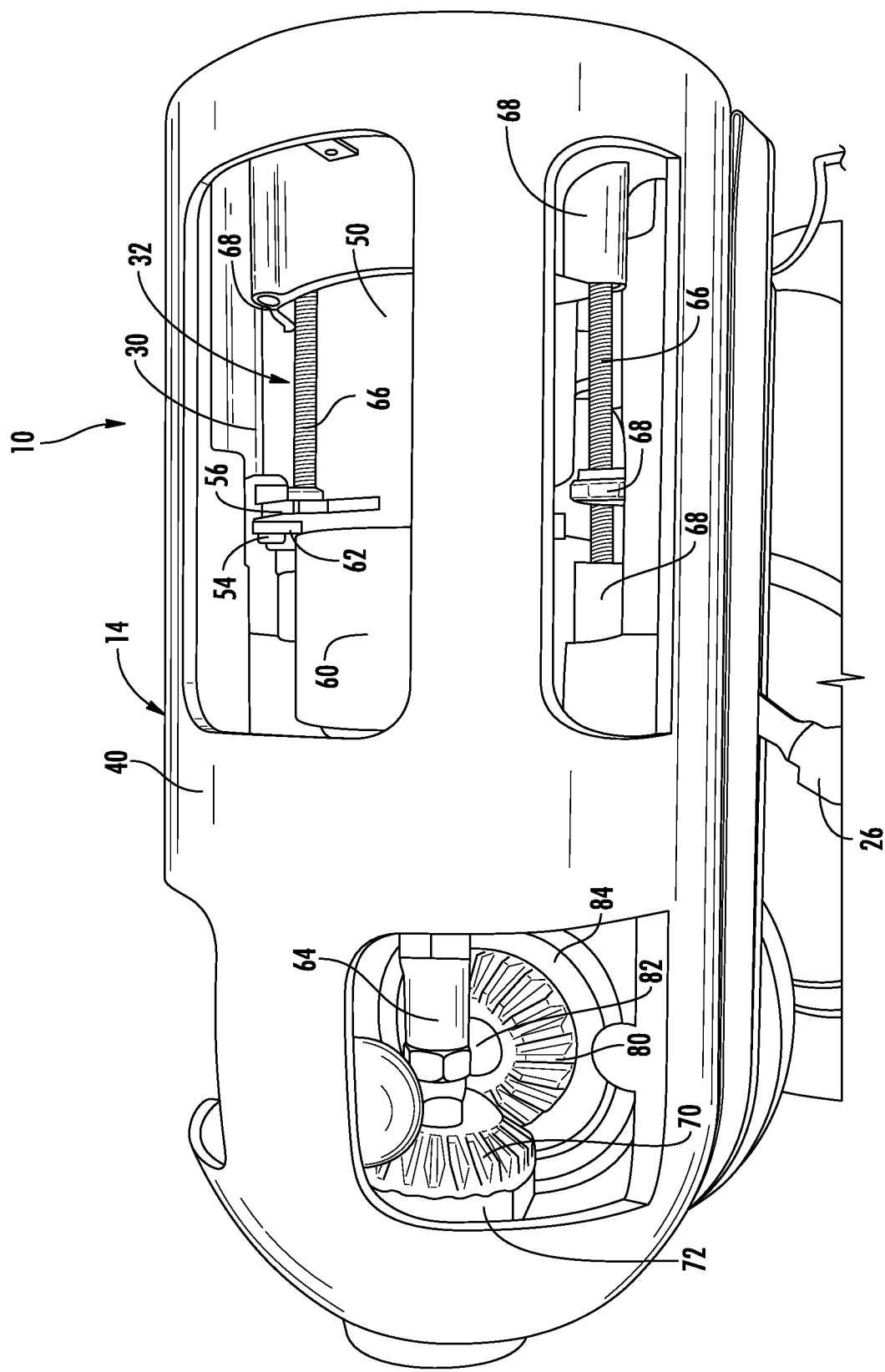
FIG. 2 is a top plan view of the mixer, partly cutaway, showing the internal components of the mixer.

FIG. 2 is a top plan view of the motor housing 14, which includes a lower section 30 and a cover section 40, shown cutaway to expose the internal components. The lower section 30 is made of cast metal and defines a cradle 32 for holding a DC drive motor 50. Motor 50 has a rotary output shaft 52 (shown schematically in FIG. 5) coupled to a reduction gear box 60 by suitable fasteners, such as bolts 54 securing flange 56 of the motor 50 to a mating flange 62 of the gear reduction box 60. The combined motor 50 and reduction gear box 60 is secured within cradle 32 of lower housing 30 by suitable bolt fasteners, such as bolts 66 (FIG. 2) threaded into mounting bosses 68 in the housing's cast lower section 30. Motor 50 can be a commercially available DC motor, such as those furnished by Leili Company, and typically operates at speeds of from about 2,000 to about 10,000 rpm. The double planetary gear box 60, also commercially available, reduces the motor speed to a usable speed of from about 100 to 500 rpm for the rotary output shaft 16 of the mixer.

The gear box 60 includes an output drive shaft 64 which is coupled to a beveled hub gear 70, which is rotatably mounted and supported in a bushing 72 in the cover 40 of housing 14. The hub gear 70 interfaces with a planetary drive gear 80 that is coupled to a drive shaft 82 which extends in orthogonal relationship to drive shaft 64. The drive shaft 82 extends downwardly through a bushing 84 to the mixer shaft 16 through a suitable conventional coupling to allow implements, such as beaters 15, to be easily coupled and decoupled to the mixer 10. The reduction in gears reduces the lubrication typically used from about 6 oz of grease to only ¼ oz to ½ oz of synthetic lubricant between gears 70 and 80. The coupling of drive shaft 82 to the rotary shaft 16 for attachment of mixing, beating, stirring, or other implements may include a conventional planetary drive 28 (FIG. 1) which rotates the rotating implement 15 in a circular pattern in the bowl.

Figure 3:
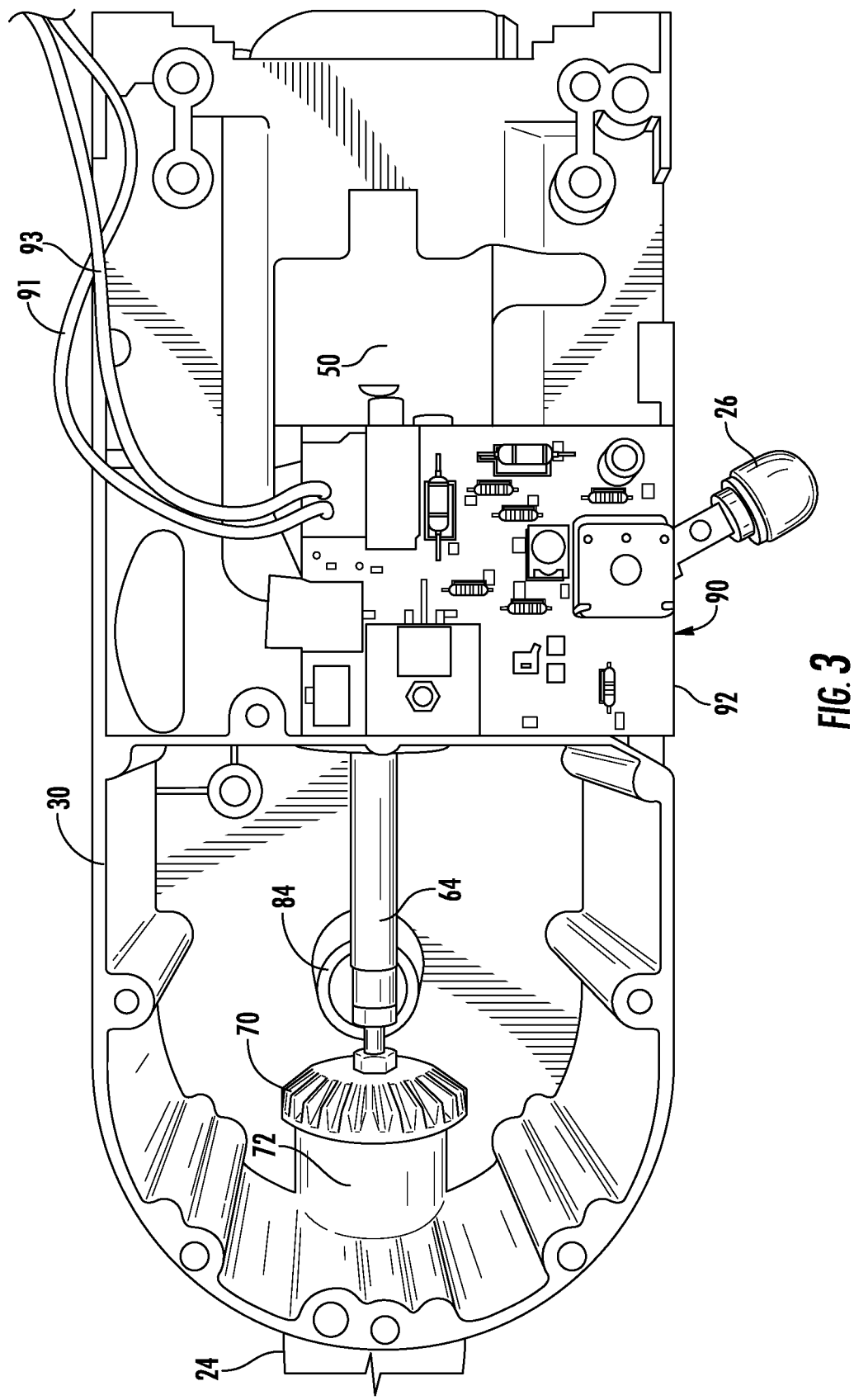
FIG. 3 is a cutaway top plan view of the mixer showing the electrical components with the planetary gear removed.
Figure 4:
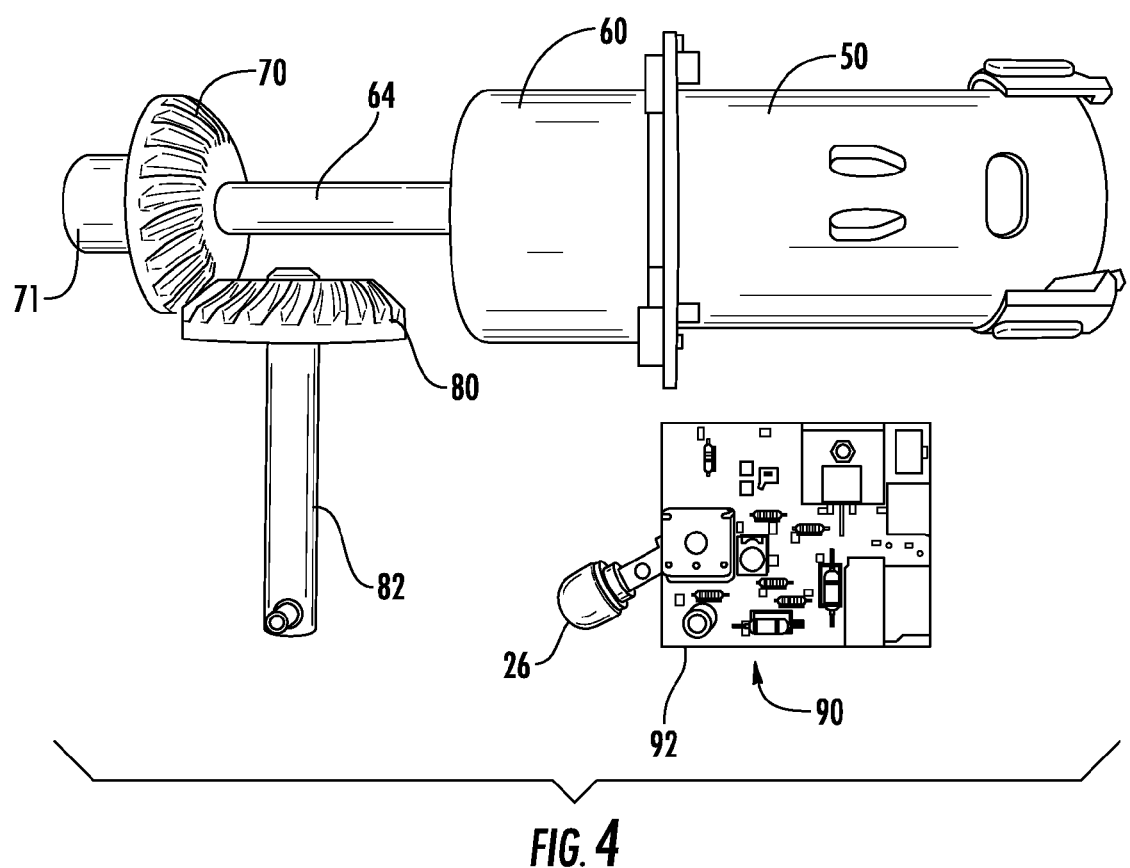
FIG. 4 is an exploded side elevational view of the mixer's internal components.

FIGS. 3 and 4 also show the major components of the mixer 10, which include an electrical control circuit 90 (shown in FIG. 5) which comprises electrical components mounted on a circuit board 92 secured to the lower section 30. A 110 voltage AC source is coupled to the circuit 90 by conductors 91 and 93 (FIG. 3) and is represented by the electrical symbol 94 in FIG. 5. The power takeoff 24 is coupled to the lower section 30 and communicates through bushing 72 to a socket 71 (FIG. 4) on the hub gear 70, such that accessories can also be driven by motor 50.

Figure 5:
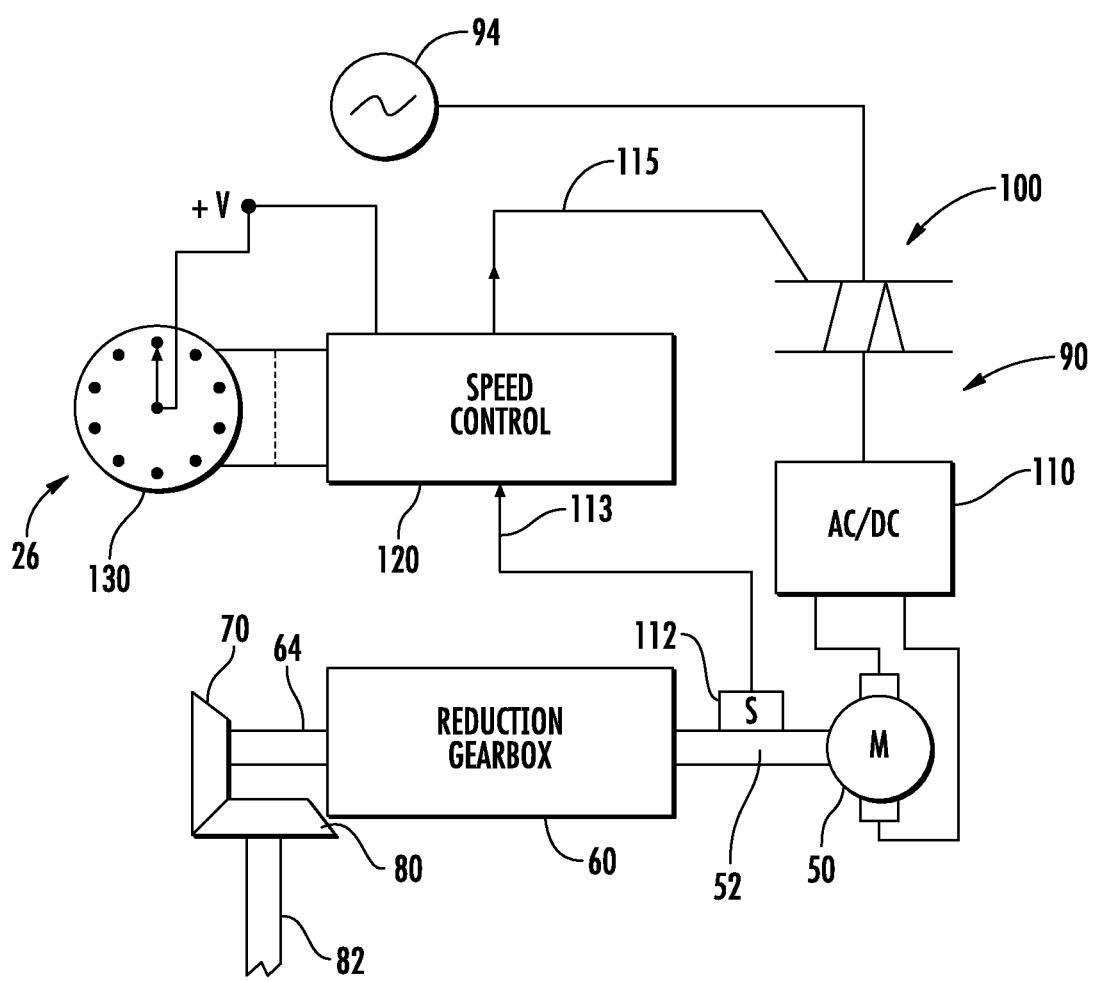
FIG. 5 is an electro-mechanical diagram in block and schematic form of the control circuit for the DC motor.

The electrical control circuit 90 is shown in the electromechanical diagram of FIG. 5, which also shows the AC supply 94 being coupled to a triac 100 having its output coupled to a bridge-type AC/DC rectifier 110 having positive and negative 110 volt DC connections to motor 50. Motor shaft 52 includes a magnet to which a Hall-effect sensor 112 is associated, such that signals identifying the rotary speed of output shaft 52 of motor 50 are supplied to a speed control circuit 120 by conductor 113. The speed control circuit provides an output signal via conductor 115 to the gate of triac 100 in response to the speed setting selected on a ten-position selector switch 130 coupled to a +V supply which also supplies operating voltage to the speed control circuit and Hall-effect sensor in a conventional manner. The speed control circuit 120 may include an ASIC or microprocessor or other conventional components to process the speed information from sensor 112 and the desired speed information from switch 130 to adjust the signals applied to triac 100, such that, the duty cycle of DC applied to motor 50 from the bridge rectifier 110 is changed to vary the speed of the motor and, therefore, the speed of drive shaft 82 coupled to the mixer implement rotary shaft 16.

Thus, the mixer 10 provides a DC motor whose speed is controlled by a solid state control circuit. The mixer design minimizes the gears employed and housing components to provide a robust mixer at a reduced cost.

It will be understood by one having ordinary skill in the art that construction of the described mixer and other components is not limited to any specific material. Other exemplary embodiments disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present application. The exemplary structures and processes disclosed herein are for illustrative purposes and are not to be construed as limiting.

It is also to be understood that variations and modifications can be made on the aforementioned structures and methods without departing from the concepts of the present application, and further it is to be understood that such concepts are intended to be covered by the following claims unless these claims by their language expressly state otherwise.

The above description is considered that of the illustrated embodiments only. Modifications will occur to those skilled in the art and to those who make or use the mixer. Therefore, it is understood that the embodiments shown in the drawings and described above is merely for illustrative purposes and not intended to limit the scope of the application, which is defined by the following claims as interpreted according to the principles of patent law, including the Doctrine of Equivalents.

What is claimed:

1. A mixer comprising;
a motor housing defining a cradle on an interior thereof;
a drive unit coupled to the housing within the cradle and including:
a direct current motor having an output shaft; and
a double planetary reducing gearbox coupled to the direct current motor and having a drive shaft coupled to said output shaft of said motor;
a hub gear rotatably coupled to said housing and coupled to said drive shaft to rotate with said drive shaft; and
a drive gear within the housing and coupled to a shaft rotatably mounted to said housing to mesh with said hub gear and provide an output drive for a mixing implement.

2. The mixer as defined in claim 1 wherein said hub and drive gears are beveled gears.

3. The mixer as defined in claim 1 and further including a control circuit for controlling the voltage applied to said direct current motor to control the motor speed and resultant speed of the mixing implement.

4. The mixer as defined in claim 3, wherein the drive shaft includes a magnet, and wherein said control circuit includes a Hall-effect sensor outputting a signal related to the speed of said drive shaft by movement of the magnet with the drive shaft and one of an application-specific integrated circuit or microprocessor coupled with the Hall-effect sensor and programmed to receive and process the signal and to determine a voltage for application to said direct current motor to control the motor speed and resultant speed of the mixing implement based on desired speed information and the processed signal from the Hall effect sensor.

5. The mixer as defined in claim 4 wherein said control circuit includes an alternating current/direct current rectifier.

6. The mixer as defined in claim 5 wherein said control circuit includes a source of alternating current voltage and a triac coupled between said source and said alternating current/direct current rectifier.

7. The mixer as defined in claim 6 and wherein said control circuit includes a speed control switch.

8. A mixer comprising;
a motor housing;
a direct current motor positioned in said housing, said motor having an output shaft including a magnet;
a mixing implement coupled to said output shaft of said direct current motor; and
a control circuit, including:

a Hall-effect sensor coupled within the motor housing adjacent the output shaft outputting a signal based on the speed of said output shaft by movement of the magnet with the output shaft; and one of an application-specific integrated circuit and a microprocessor coupled with the Hall-effect sensor and the direct current motor and programmed to receive and process the signal from the Hall-effect sensor and to determine a voltage for application to said direct current motor to control the motor speed and resultant speed of the mixing implement based on desired speed information and the processed signal from the Hall effect sensor.

9. The mixer as defined in claim 8 and further including a double planetary reducing gearbox coupled to the direct current motor and having a drive shaft coupled to said output shaft of said motor and including a drive shaft.

10. The mixer as defined in claim 9 and further including a hub gear rotatably coupled to said housing and coupled to said drive shaft to rotate with said drive shaft and a planetary gear coupled to a shaft rotatably mounted to said housing to mesh with said hub gear and provide an output drive for a mixing implement.

11. The mixer as defined in claim 10 wherein said control circuit includes an alternating current/direct current rectifier.

12. The mixer as defined in claim 11 wherein said control circuit includes a source of alternating current voltage and a triac coupled between said source and said alternating current/direct current rectifier.

13. The mixer as defined in claim 12 and wherein said control circuit includes a speed control switch in electronic communication with the one of an application-specific integrated circuit and a microprocessor.

14. A mixer comprising;
a motor housing defining a cradle on an interior thereof; and
a drive unit coupled to the housing within the cradle and including:
a direct current motor having an output shaft;
a double planetary reducing gearbox coupled to the direct current motor and having a drive shaft coupled to said output shaft of said motor and including a drive shaft;
a hub gear rotatably coupled to said housing and coupled in axial alignment with said drive shaft to rotate with said drive shaft; and
a drive gear within the housing and coupled to a shaft rotatably mounted to said housing in orthogonal relationship with said drive shaft to provide an output drive for a mixing implement.

15. The mixer as defined in claim 14 and further including a control circuit for controlling the voltage applied to said direct current motor to control the motor speed and resultant speed of the mixing implement.

16. The mixer as defined in claim 15, wherein the output shaft includes a magnet, and wherein said control circuit includes a Hall-effect outputting a signal related to the speed of said drive shaft by movement of the magnet with the driveshaft and one of an application-specific integrated circuit or microprocessor coupled with the Hall-effect sensor and programmed to receive and process the signal.

17. The mixer as defined in claim 16 wherein said control circuit includes an alternating current/direct current rectifier.

18. The mixer as defined in claim 17 wherein said control circuit includes a source of alternating current voltage and a triac coupled between said source and said alternating current/direct current rectifier.

19. The mixer as defined in claim 18 and wherein said control circuit includes a speed control switch.

20. The mixer as defined in claim 14 wherein said hub and drive gears are beveled gears.

21. The mixer as defined in claim 1 wherein:
the direct current motor produces an output shaft speed that is variable from about 2,000 revolutions per minute to about 10,000 revolutions per minute;
the reducing gearbox reduces the output shaft speed to produce a drive shaft speed that is correspondingly variable from about 100 revolutions per minute to about 500 revolutions per minute.

* * * * *